United States Patent [19]

Østlie

[11] Patent Number: 5,653,052
[45] Date of Patent: Aug. 5, 1997

[54] METHOD FOR IMMOBILIZING OR KILLING SWIMMING LARVAE IN A MASS OF FRESH WATER, AND AN ELECTRIC TRAP FOR PRACTICING SUCH A METHOD

[75] Inventor: Lars Østlie, Stratford Upon Avon, England

[73] Assignee: Ocean Environmental Technologies Limited, London, England

[21] Appl. No.: 488,500

[22] Filed: Jun. 9, 1995

Related U.S. Application Data

[63] Continuation-in-part of Ser. No. 129,038, filed as PCT/NO92/00061 Apr. 3, 1992 published as WO92/17061 Oct. 15, 1992, abandoned.

[30] Foreign Application Priority Data

Apr. 3, 1991 [NO] Norway ................. 911307

[51] Int. Cl.[6] ................ H01M 19/00; A01K 79/02
[52] U.S. Cl. ........................ 43/17.1; 205/147
[58] Field of Search ............. 43/17.1, 112, 100; 361/271, 327; 452/58, 59; 205/147, 196, 131

[56] References Cited

U.S. PATENT DOCUMENTS

| 948,355 | 2/1910 | Tatro et al. ................. 43/112 |
|---|---|---|
| 1,515,547 | 11/1924 | Burkey ..................... 119/220 |
| 2,146,105 | 2/1939 | Baker ...................... 119/220 |
| 2,485,660 | 10/1949 | Robertson ................... 43/112 |
| 2,709,984 | 6/1955 | Marks ...................... 119/220 |
| 2,745,205 | 5/1956 | Kafka ...................... 470/140 |
| 2,836,735 | 5/1958 | Kreutzer .................... 43/17.1 |
| 3,095,359 | 6/1963 | Heller . |  |
| 3,180,047 | 4/1965 | Kreutzer .................... 43/17.1 |
| 3,363,356 | 1/1968 | Kreutzer .................... 43/17.1 |
| 4,457,221 | 7/1984 | Geren ...................... 422/23 |
| 4,646,276 | 2/1987 | Kowalewski et al. ........... 367/139 |
| 4,758,318 | 7/1988 | Yoshida .................... 204/131 |
| 4,825,810 | 5/1989 | Sharber .................... 119/220 |
| 4,869,016 | 9/1989 | Diprose et al. .............. 43/17.1 |
| 5,270,912 | 12/1993 | Sharber et al. .............. 43/17.1 |
| 5,289,133 | 2/1994 | Kolz ....................... 43/17.1 |
| 5,326,530 | 7/1994 | Bridges .................... 422/22 |

FOREIGN PATENT DOCUMENTS

| 0369557 | 5/1990 | European Pat. Off. . |
|---|---|---|
| 0468739 | 1/1992 | European Pat. Off. . |
| 1073629 | 1/1960 | Germany . |
| 4-341392 | 11/1992 | Japan ...................... 204/131 |
| 83894 | 6/1954 | Norway . |
| 140958 | 6/1953 | Sweden . |
| 480382 | 10/1975 | U.S.S.R. . |
| 513681 | 6/1976 | U.S.S.R. . |
| 1199222 | 12/1985 | U.S.S.R. . |
| 812124 | 4/1959 | United Kingdom ............. 204/131 |

*Primary Examiner*—Jeanne Elpel
*Attorney, Agent, or Firm*—Wenderoth, Lind & Ponack

[57] ABSTRACT

Larvae swimming in a mass of fresh water and having interiors substantially constituted of highly electrically conductive substance are immobilized or killed. Two capacitor plates, which include exterior insulation, are located on opposite sides of the mass of fresh water. A low power AC voltage is applied across the plate. The AC voltage is sufficient to establish an alternating electric field in the mass of fresh water between the plates and to alternately polarize the mass of fresh water and the larvae. Thereby is generated an AC current in the substance in the interiors of the larvae sufficient to cause therein a concentrated power dissipation of immobilizing or killing magnitude.

13 Claims, 3 Drawing Sheets

METHOD FOR IMMOBILIZING OR KILLING SWIMMING LARVAE IN A MASS OF FRESH WATER, AND AN ELECTRIC TRAP FOR PRACTICING SUCH A METHOD

This application is a continuation-in-part of application Ser. No. 08/129,038, now abandoned, filed Dec. 1, 1993 that is the U.S. National Stage of International Application PCT/NO92/00061 filed Apr. 3, 1992, published as WO92/17061 Oct. 15, 1992.

BACKGROUND OF THE INVENTION

The present invention relates to a method of immobilizing or killing swimming larvae in a mass of fresh water, and to an electric trap for practicing such method. In the method comprising use of the trap, an alternating electric field is generated between electrodes, at least one of which is insulated, in fresh water in order to influence larvae or similar living organisms (macro-organisms).

In this manner it is possible to deactivate or kill larvae without any use of chemistry (poison), in a manner which is favorable to the environment and capable of dealing with large water volumes. Such a system is important in connection with, inter alia, water inlets which are exposed to fouling by fresh-water organisms like fresh-water mussels.

Usually these problems are combated by the use of chemical methods. This means that a poison is introduced at an initial position in the system (e.g. a water inlet). This poison may have the form of a liquid (chlorine), a gas (ozone) or the shape of solid particles which float in the water and dissolve successively. Most of these chemical systems are of such a nature that all of or parts of the amount of poison return to the reservoir supplying the water. Thus the poison concentration may increase gradually, and this is not environmentally acceptable. In order to compensate for this effect, systems have been introduced where the poison is neutralized (e.g. by using clay), or unstable poisons (ozone) have been used, neutralizing themselves in a short time.

However, it is favorable to be able to avoid such environmental influences completely, and it has turned out to be possible to use electric effects in order to influence swimming organisms. However, it is not possible to find much literature regarding prior art in this field. Some studies have been made relating to how certain organisms behave in a DC voltage field (e.g. adjacent to a direct current conductor), and the influence from magnetic fields has also been studied to a certain degree. Relatively few studies have been made regarding the influence of electric AC fields on larvae and other macro-organisms.

Some experiments conducted in Russia by M. Y. Kirpichenko show that relatively weak electric fields (7–10 volts/cm), exposing larvae during a long period (30–50 hours), depending on water temperature, reduce the larvae deposit and provides a high mortality (above 90%).

There have also in Russia been executed extensive experiments leading to certain pilot installations in power plants, where the water passes through an electrostatic filter with 50 Hz sinusoidal AC voltages on the order of 220–450 volts, depending on the stage of development of the larvae. In general it is possible to state that the larvae must be exposed at least one second for mortality, however this time can be reduced by altering the shape of the pulses.

One system for preventing fouling which is based upon the use of an electric field in connection with electrolysis is also known, such a system being published in a patent application assigned to Mitsubishi, Japan, corresponding to EP 0 369 557, published May 23, 1990. The problem of such an electrolysis system is, however, that the electrodes are in direct contact with the water, and hence there flows a strong electric current which mainly heats the water. Therefore, such a system is usually not very cost-efficient.

Most experiments have been conducted with larvae in sea water, and these experiments show that an electric field does not affect the larvae directly, inter alia, because the current "flows" around and past the larva.

From Norwegian Patent No. 83894, Swedish Patent No. 140958 and German Offenlegungsschrift No. 1073629 there are known fish catch means for use in salt water, where a pulsed current is used, i.e. a DC current with superposed AC components. Thereby the fish is intended to be stunned or killed by electric current conduction. Very high voltages are used, and since salt water is a good electric conductor, large currents will flow, i.e. the generator supplying current to the electrodes in the water must be able to deliver a very high electric power.

It is desirable to be able to immobilize or kill larvae also in fresh water, and preferably using an alternating electric field which can be generated without power dissipation of the same magnitude or order as is the case in salt water.

SUMMARY OF THE INVENTION

The present invention is directed to a method and an apparatus for immobilizing or killing swimming larvae in a mass of fresh water.

The invention is based upon studies of swimming larvae, which studies have elucidated the causes of the behavior of the larvae in electric fields. It has been observed that swimming characteristics and other activities of the larvae are influenced when changes take place in the electric field surrounding them. The direction of the helicoidal swimming pattern of the larvae is clearly influenced, and this observation together with observations made when larvae are located in a magnetic field (hovering), show that they align lengthwise in the field direction. In other words, the larvae become polar when they enter the field. This polarity is induced polarity, and not natural polarity.

The conditions inside and closely adjacent the larvae as regards the electric fields depend on the physiology of the larva and on how the applied electric field is established. The cause of the phenomenon of the DC current flowing around the larva, and hence not through the larva, is to be found in the physiological conditions regarding the substances found in the surface of the larva. It is clear that the larva surface has a markedly lower conductivity than the substances located inside the larva body, since the larva interior mostly consists of highly conductive water (more than 90%).

The difference between the larva behaviour in a constant field and in an alternating electric field is that a larva which is situated in a constant and stable applied electric field for a limited time period is not influenced to any particular degree, while an alternating field can be mortal. The cause in the first case is that the applied electric DC field will try to generate an opposing field inside the larva. When this opposing field is created, an energy transport, i.e. a current flow, will take place inside the larva body, but as soon as this has been done, a stable situation arises wherein the larva is not further influenced in its interior, but only on the outside through the fact that the swimming pattern is influenced by forces in connection with the applied electric field. What may happen is that the forces act on the larva so that it is drawn toward the position of origin of the electric field. This may explain the theory that an increased deposition may take place when using a weak applied electric field.

When the applied electric field is changed, there will at the same time occur a change in the polarity of the larva, i.e. a current flows in the larva body in order to create an opposing field in relation to the applied field. In this process an internal energy transport takes place in the body of the larva. Such a field change (pulse) will also influence the electric system of the larva (nerve pulses), which is a determining factor for the activities of the larva, inter alia, for its swimming function.

BRIEF DESCRIPTION OF THE DRAWINGS

The invention will be described more fully in the following, reciting an examplary embodiment and referring to the enclosed drawings.

FIG. 5(a) showing a non-polar type (a), which through induction become polar in an electric field and hence align according to the field as shown in FIG. 5(b)

DETAILED DESCRIPTION OF THE INVENTION

Figure 1:
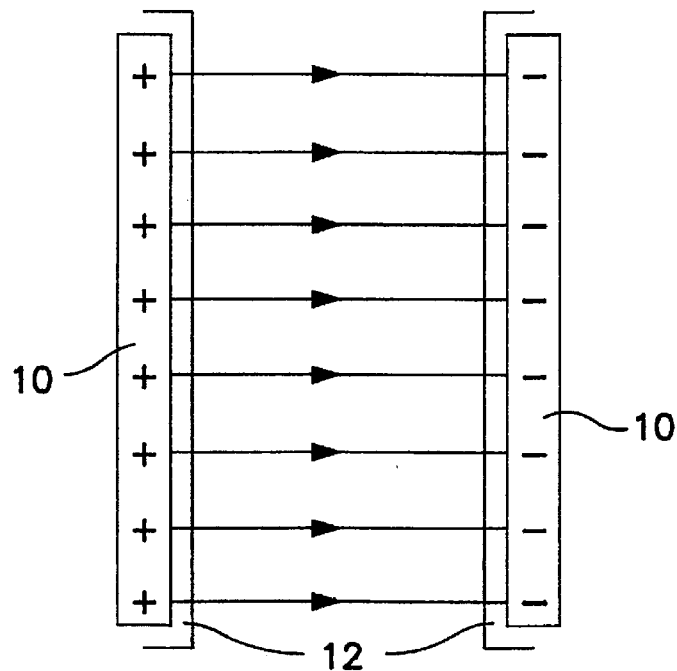
FIG. 1 is a diagram showing a homogenous electric field between two insulated plates, where the insulator material has a very low susceptibility.
Figure 2:
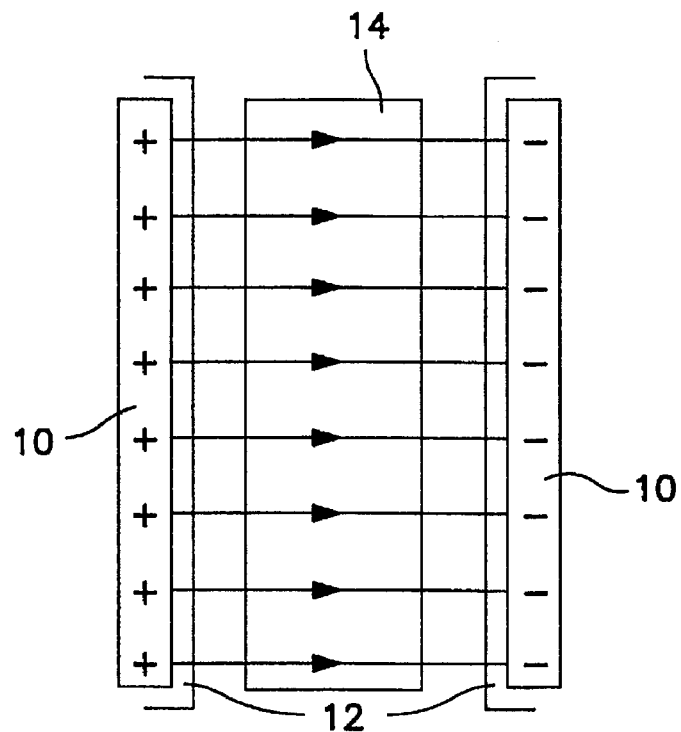
FIG. 2 is a similar diagram showing a column of water introduced between the two plates of FIG. 1.

The larvae may most simply be considered as conductive particles distributed in fresh water which has intrinsically low conductivity (capacitor theory). The system in accordance with the invention will operate in connection with water inlets in fresh water, where there are larvae of freshwater mussels. The illustrated enbodiment of the invention is based upon a system of two insulated metal plates 10 (see FIG. 1) which are placed in fresh water, see FIG. 2, and insulation material 12 around the metal plates is very thin and consists of a material of low susceptibility, i.e. this material is only weakly polarized when it is exposed to electric field. The illustrated and preferred embodiment of the present invention provides that both of plates 10 have layers of insulation material 12. However, it has been determined that the invention will work if only one of the capacitor plates 10 is provided with a layer of insulation material 12, while the other plate constitutes a semi-conductive/semi-insulated plate.

Fresh water 14 between the plates is regarded as a dielectric, i.e. an insulator with a low or limited number of free electric charges. Water which is completely pure, has a very low conductivity. If impurities are introduced in the water, this may increase the conductivity. Impurities in fresh water mostly consist of non-conductive material like silt and microscopic sand particles (clay), possibly of a conductive type, such as dissolved metal ions.

As previously mentioned, the larvae have a conductive interior, however their surface layer conducts electricity poorly. Viewed from the outside, the larvae can therefore be considered as polarizable particles. However, the larvae may also be considered as conductive particles under transient conditions, due to their conductive interior volume.

Figure 5A:
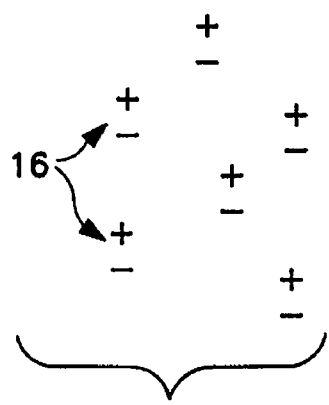
FIGS. 5(a) and 5(b) are diagrams showing conductive partices (i.e. larvae).

Thus, when considering the present invention, the water between the capacitor plates can be regarded as a dielectric, where the larvae are non-polar and conductive particles 16 (see FIG. 5(a).

Figure 3:
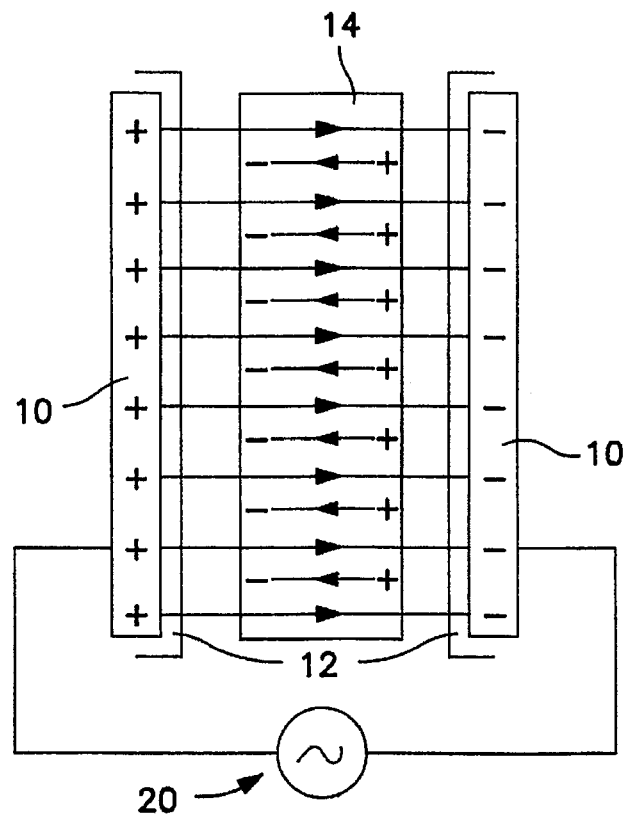
FIG. 3 is a similar diagram showing an "opposing field" generated in the water column by polarization.
Figure 4:
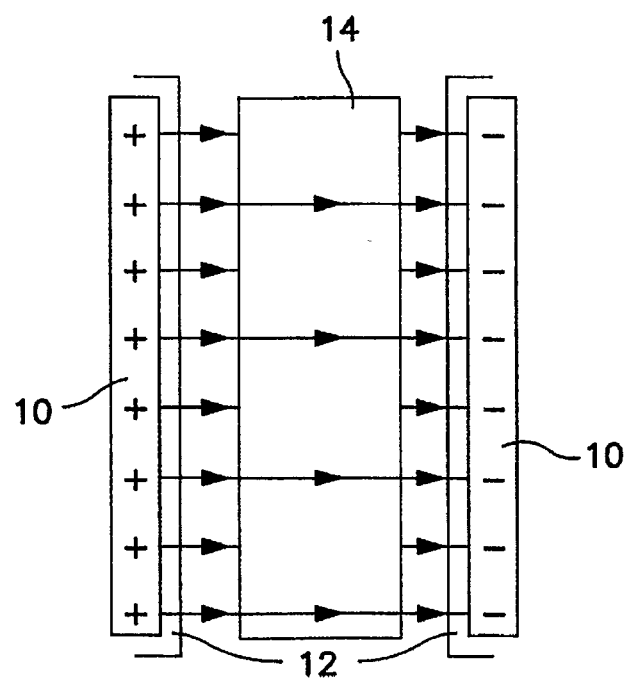
FIG. 4 is a similar diagram showing the decreased electric field which is the result in the water column.
Figure 5B:
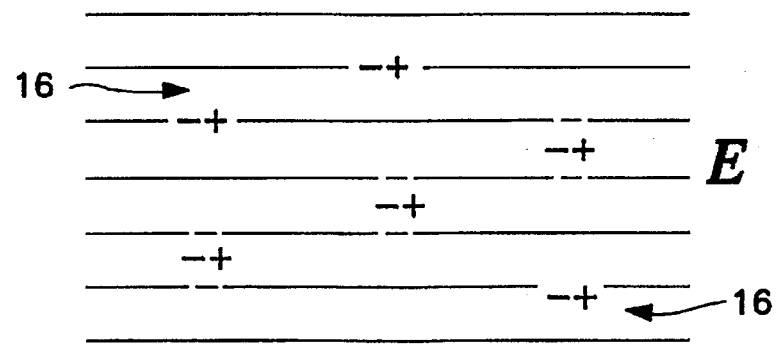
Figure 6:
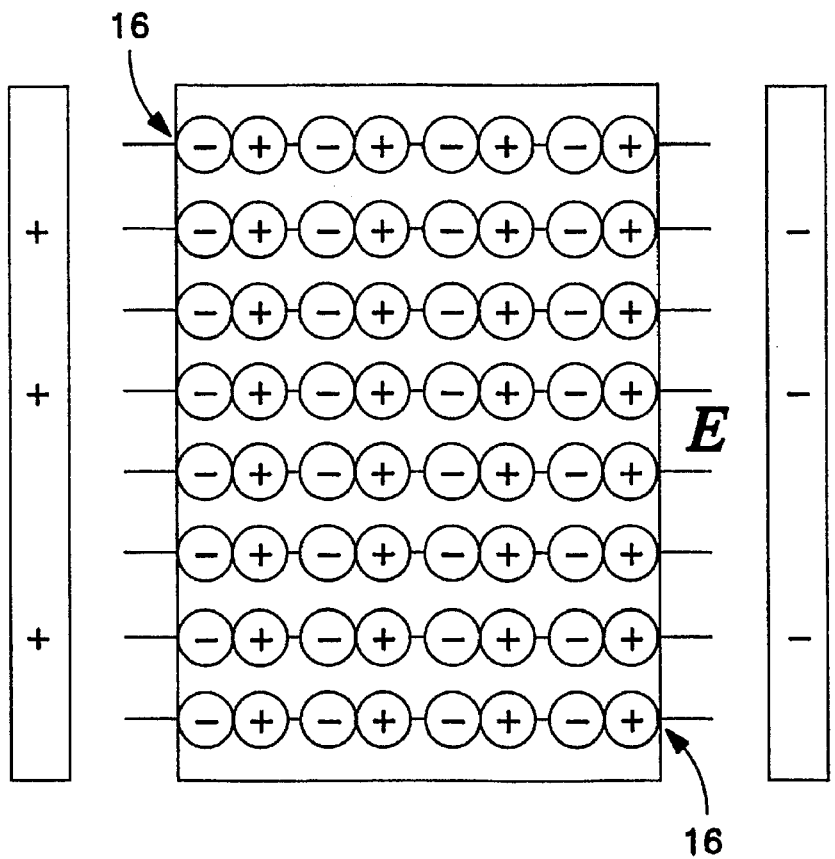
FIG. 6 is a diagram showing a conceived situation with polar larvae in a water column with an applied electric field.

When a strong electric field is established in the water, e.g. by a low power, high voltage AC pulse generator 20 as shown in FIG. 3, the water molecules will be polarized, and constitute the poles which align in a direction opposite to the field, i.e. thereby an opposing field is created in the water between the plates (see FIG. 4). The larvae will also form such polar particles (see FIG. 5(b)), where an energy transport will occur inside the larva in the moment when the opposing field is created (i.e. ions will move in a direction from one side to the opposite side), see FIG. 6, and a current E arises inside the larva. Due to the electric field forces, the largest opposing field will be established in the longitudinal direction of the larva, and the larva will be forced to align with the field direction. In this manner the larva will turn until it lies along the electric field lines, and the opposing field will arise in the longitudinal direction of the larva, where maximum voltage drop will occur. In this manner the larvae 16, here to be considered as conductive particles, will so to speak attempt to short-circuit the plates.

By using an alternating high intensity electric field, and short and sharp pulses, the internal energy transport in the larva will alternate from side to side. The opposing field inside the larva together with the associated current which arises will influence the activities of the larva, and may possibly kill the larva.

Calculations can be made regarding the necessary voltage, pulse width and pulse frequency in connection with the distance between plates and plate size. These parameters depend on water conditions, and particularly on the conductivity (i.e. larvae density), but also on water flow through the volume in question, etc. Normally the magnitude of the applied field will be far below the level where corona may occur, i.e. electric breakdown and discharge. Experiments have employed a power source achieving an electric field of 2 kV per 6 mm. It is believed that such would be a minimum value. It also is believed that the frequency of the power source would be from 500 to 5,000 Hz. Again however, one of ordinary skill in the art, after reading the present disclosure, would be able to determine appropriate parameters necessary to carry out the disclosed functions of the present invention, i.e. immobilizing or killing larvae, particularly mussel larvae, in a particular installation involving particular fresh water.

The method disclosed here implies that it is possible to use only a relatively small amount of energy to deactivate and/or kill the larvae, since the main part of the energy dissipation occurs inside the larva body (internal energy dissipation as previously mentioned), while a small amount of energy is lost in the water. This is in contrast to the systems previously mentioned, where electric current is run through the water at large potentials in order to kill larvae, where at the same time a substantial energy loss occurs due to the large values of current. This energy is spent in heating water.

I claim:

1. A method of immobilizing or killing swimming larvae in a mass of fresh water, wherein said larvae have interiors substantially constituted of highly electrically conductive substance, said method comprising:

locating on opposite sides of said mass of fresh water two capacitor plates at least one of which includes exterior insulation; and applying across said plates a low power AC voltage sufficient to establish an alternating electric field in said mass of fresh water and to alternately polarize said mass of fresh water and said larvae, and thereby to generate an AC current in said substance in said interiors of said larvae sufficient to cause therein a concentrated electric power dissipation of immobilizing or killing magnitude.

2. A method as claimed in claim 1, wherein said AC voltage is a pulse-shaped voltage.

3. A method as claimed in claim 1, comprising applying said AC voltage at a frequency of 500 to 5000 Hz.

4. A method as claimed in claim 1, wherein said establishment of said electric field causes said larvae to align longitudinally parallel to said electric field.

5. A method as claimed in claim 1, wherein said electric field is at least 2 kV per 6 mm.

6. A method as claimed in claim 1, wherein both said plates include exterior insulation.

7. An electric trap for immobilizing or killing swimming larvae in a mass of fresh water, wherein the larvae have interiors substantially constituted by highly electrically conductive substance, said electric trap comprising:

two capacitor plates to be located on respective opposite sides of the mass of water, at least one said capacitor plate having an exterior electrically insulating layer; and a low power AC generator connected to said two capacitor plates for applying thereacross a voltage sufficient to establish an alternating electric field in the mass of fresh water between said two capacitor plates and to alternately polarize the mass of fresh water and the larva swimming therein, and thereby to generate an AC current in the substance in the interiors of the larvae sufficient to cause therein a concentrated power dissipation of immobilizing or killing magnitude.

8. An electric trap as claimed in claim 7, wherein said generator comprises a pulse generator.

9. An electric trap as claimed in claim 7, wherein said generator has a frequency of 500 to 5000 Hz.

10. An electric trap as claimed in claim 7, wherein said electric field is at least 2 kV per 6 mm.

11. An electric trap as claimed in claim 7, wherein each of said capacitor plates has a respective said exterior electrically insulating layer.

12. An electric trap as claimed in claim 11, wherein said insulating layers are formed of a material that is only weakly polarized when exposed to an electric field.

13. An electric trap as claimed in claim 7, wherein said insulating layer is formed of a material that is only weakly polarized when exposed to an electric field.

* * * * *